United States Patent
Endo et al.

(10) Patent No.: US 9,085,744 B2
(45) Date of Patent: Jul. 21, 2015

(54) GREASE COMPOSITION AND BEARING

(75) Inventors: Toshiaki Endo, Fujisawa (JP); Yuji Onuki, Fujisawa (JP); Yutaka Imai, Fujisawa (JP)

(73) Assignee: KYODO YUSHI CO., LTD., Kanagawa (JP)

( * ) Notice: Subject to any disclaimer, the term of this patent is extended or adjusted under 35 U.S.C. 154(b) by 148 days.

(21) Appl. No.: 12/593,111

(22) PCT Filed: Apr. 24, 2007

(86) PCT No.: PCT/JP2007/058800
§ 371 (c)(1),
(2), (4) Date: Sep. 25, 2009

(87) PCT Pub. No.: WO2008/117478
PCT Pub. Date: Oct. 2, 2008

(65) Prior Publication Data
US 2010/0093567 A1    Apr. 15, 2010

(30) Foreign Application Priority Data

Mar. 26, 2007 (JP) .................................. 2007-079734

(51) Int. Cl.
*C10M 169/02* (2006.01)
*F16C 33/66* (2006.01)

(52) U.S. Cl.
CPC .......... *C10M 169/02* (2013.01); *F16C 33/6633* (2013.01); *C10M 2203/1006* (2013.01); *C10M 2207/0406* (2013.01); *C10M 2207/128* (2013.01); *C10M 2207/2805* (2013.01); *C10M 2207/2835* (2013.01); *C10M 2207/301* (2013.01); *C10M 2215/064* (2013.01); *C10M 2215/1026* (2013.01); *C10M 2219/044* (2013.01); *C10N 2230/02* (2013.01); *C10N 2230/06* (2013.01); *C10N 2230/08* (2013.01); *C10N 2240/02* (2013.01); *C10N 2250/10* (2013.01)

(58) Field of Classification Search
USPC ............................................... 508/464, 552
See application file for complete search history.

(56) References Cited

U.S. PATENT DOCUMENTS

| 5,043,085 | A | * | 8/1991 | Kinoshita et al. ............. 508/316 |
| 5,059,336 | A | | 10/1991 | Naka et al. |
| 5,728,659 | A | | 3/1998 | Naka et al. |
| 2008/0026963 | A1 | | 1/2008 | Sakamoto et al. |

FOREIGN PATENT DOCUMENTS

| EP | 1867705 | 12/2007 |
| JP | 03-079698 | 4/1991 |
| JP | 09-003466 | 1/1997 |
| JP | 09-059661 | 4/1997 |
| JP | 2979274 | 9/1999 |
| JP | 2001-107073 | 4/2001 |
| JP | 2001-304281 A | 10/2001 |
| JP | 2002-021859 A | 1/2002 |
| JP | 2003-306687 | 10/2003 |
| JP | 2005-180575 A | 7/2005 |
| WO | WO2006/109541 | 10/2006 |

OTHER PUBLICATIONS

International Search Report for PCT/JP2007/058800, mailed Jul. 31, 2007.
Written Opinion of the International Searching Authority for PCT/JP2007/058800, mailed Jul. 31, 2007.
European Search Report issued for corresponding European Patent Application No. 07742235.0-2104/2135927 PCT/JP2007058800 dated Sep. 27, 2012.
Korean Notice of Allowance issued for corresponding Korean Patent Application No. 10-2009-7018691, dated Mar. 29, 2013.

* cited by examiner

*Primary Examiner* — Taiwo Oladapo
(74) *Attorney, Agent, or Firm* — Nixon & Vanderhye P.C.

(57) ABSTRACT

A grease is provided which has an improved inflow property of the grease into a lubrication unit and has a long life when used for bearings even under a high temperature environment. A grease composition comprising a base oil and a thickener, characterized in that the base oil contains an ester synthetic oil, the content of the ester synthetic oil is not less than 20% by mass of the total mass of the base oil and the thickener contains a diurea compound represented by the Formula (I):

$$R^1\text{---NHCONH---}R^2\text{---NHCONH---}R^3, \quad (I)$$

wherein $R^2$ is a $C_{6-15}$ divalent aromatic hydrocarbon group, $R^1$ and $R^3$ are the same or different, and represent cyclohexyl or $C_{8-22}$ linear or branched alkyl, and the molar ratio of cyclohexyl to the total of cyclohexyl and $C_{8-22}$ linear or branched alkyl is 60 to 95%.

8 Claims, No Drawings

GREASE COMPOSITION AND BEARING

This application is the U.S. National Phase of International Application No. PCT/JP2007/058800, filed 24 Apr. 2007, which designated the U.S. and claims priority to Japan Application No. 2007-079734, filed 26 Mar. 2007 the entire contents of each of which are hereby incorporated by reference.

TECHNICAL FIELD

The present invention relates to a grease composition and a bearing, particularly to a grease composition suitably used for rolling bearings for automobile electrical equipment or auxiliaries and to rolling bearings for automobile electrical equipment or auxiliaries in which the grease composition is filled.

BACKGROUND ART

A long lubrication life is required for a grease which lubricates a portion such as rolling bearings for automobile electrical equipment or auxiliaries, which is heated to extremely high temperatures and subjected to extremely high speed movements. In order to provide a long lubrication life, the properties of the grease to easily flow into the lubrication unit, as well as heat-resistant property, are required. Such an inflow property of the grease is particularly strongly required when outer race rotation type bearings are used for the bearings, since it is more difficult for the grease to flow into the lubrication unit, for example due to the action of centrifugal force in the outer race rotation type bearings. On the other hand, when the inflow property is too high, the grease is soft and leaks from the bearings, and therefore the lubrication life becomes short. Thus, a grease which has a good balance between heat-resistant property and inflow property is demanded.

Examples of outer race rotating bearings for automobile electrical equipment or auxiliaries include bearings used for electromagnetic clutch, intermediate pulley, idler pulley, tension pulley and the like used for automobile air conditioners. On the other hand, examples of inner race rotating bearings include bearings used for alternators and the like.

The grease which has a long life when used for outer ring rotation type bearings may be used not only for the outer ring type bearings but also for inner race rotation type bearings since, as described above, the grease has a good balance between heat-resistant property and inflow property.

Diurea greases which employ mainly a synthetic hydrocarbon oil or phenyl ether synthetic oil as a base oil are used as the grease used for rolling bearings for automobile electrical equipment or auxiliaries. In many cases, an aromatic diurea grease is used among diurea greases since it has an excellent high-temperature resistance. However, the lives of this sort of greases are not nearly satisfactory when used for outer race rotation type bearing because of insufficient inflow property of the greases into the lubrication unit.

In the meantime, as an example of improving the inflow property by a thickener, Patent Document 1 describes a grease composition in which the diurea compound represented by the following general formula is employed as a thickener in a base oil containing an ether synthetic oil in an amount more than 50% by mass of the base oil:

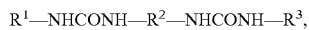

wherein $R^2$ represents $C_{6-15}$ divalent aromatic hydrocarbon group, $R^1$ and $R^3$, the same or different, represent cyclohexyl, $C_{7-12}$ cyclohexyl derivative groups or $C_{8-20}$ alkyl; and the ratio of the number of moles of cyclohexyl and derivative groups thereof to the total number of moles of cyclohexyl, $C_{7-12}$ cyclohexyl derivative groups and $C_{8-20}$ alkyl is 50 to 100%

However, this grease composition lacks in compatibility between the base oil and the thickener, lacks in inflow property, and the life of the bearing is not satisfactory.

Patent Document 1 JP 2979274 B

DISCLOSURE OF THE INVENTION

Problems to be Solved by the Invention

An object of the present invention is to provide a grease composition and a bearing.

Another object of the present invention is to provide a grease which has an improved inflow property into a lubrication unit and has a long life when used for bearings even under a high temperature environment.

Means for Solving the Problems

The present invention provides the following grease composition and bearings.

1. A grease composition comprising a base oil and a thickener, characterized in that the base oil contains an ester synthetic oil, the content of the ester synthetic oil is not less than 20% by mass of the total base oil and the thickener contains a diurea compound represented by the Formula (I):

$$R^1\text{—NHCONH—}R^2\text{—NHCONH—}R^3, \qquad (I)$$

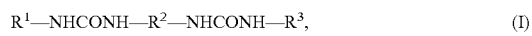

wherein $R^2$ is a $C_{6-15}$ divalent aromatic hydrocarbon group, $R^1$ and $R^3$ are the same or different, and represent cyclohexyl or $C_{8-22}$ linear or branched alkyl and the molar ratio of cyclohexyl to the total of cyclohexyl and $C_{8-22}$ linear or branched alkyl is 60 to 95%.

2. The grease composition according to the above item. 1, wherein the ester synthetic oil is an ester synthetic oil which has three or more ester groups in the molecule.
3. The grease composition according to the above item 1 or 2, wherein the ester synthetic oil is at least one selected from the group consisting of trimethylolpropane ester oils, trimellitic acid ester oils, pyromellitic acid ester oils, pentaerythritol ester oils, dipentaerythritol ester oils, and complex ester oils.
4. The grease composition according to any one of the above items 1 to 3, which is for bearings.
5. The grease composition according to the above item 4, wherein the bearings are rolling bearings for automobile electrical equipment or auxiliaries.
6. The grease composition according to the above item 5, wherein the rolling bearings for automobile electrical equipment or auxiliaries are outer race rotation type bearings.
7. A bearing in which the grease composition according to any one of the above items 1 to 6 is filled.

Effect of the Invention

The grease composition of the present invention has an improved inflow property into the lubrication unit, which makes the bearing life longer even under high temperature environments. Thus, it is an excellent grease for bearings and exerts excellent effects as a grease for bearings, particularly as a grease for rolling bearings for automobile electrical equipment or auxiliaries and more particularly as a grease for bearings used for outer race rotating of rolling bearings for automobile electrical equipment or auxiliaries.

EMBODIMENTS FOR CARRYING OUT THE INVENTION

As described above, inflow property of the grease into the lubrication unit is required to obtain a long service life, and on the other hand, when the inflow property is too high, the grease is soft and leaks from the bearings, and therefore the life of the lubrication unit becomes short. Thus, it is important that a grease has a good balance between heat-resistant property and inflow property.

The grease of the present invention is characterized in that the grease has a balance between heat-resistant property and inflow property by controlling inflow property together with securing heat-resistant property by increasing the ratio of cyclohexyl group in the above-described diurea compound while improving the inflow property of the grease by employing an ester synthetic oil which is compatible with the thickener because the oil has a polarity.

Examples of thickeners generally used for a grease composition include metallic soap thickeners containing Li, Na or the like; and non-soap thickeners such as benton, silica gel, diurea compounds and fluorinated thickeners represented by polytetrafluoroethylene. Metallic soap thickeners, benton and silica gel, however, are not acceptable with respect to the heat resistant property, that is, a bearing lubrication life under a high temperature. Though the fluorinated thickener is acceptable with respect to the heat-resistant property, the price of the thickener is too high and lacks general versatility.

Therefore, the grease composition of the present invention is characterized by employing a particular diurea thickener represented by the general formula I.

In the general formula I, the molar ratio of cyclohexyl group to the total of cyclohexyl group and $C_{8-22}$ linear or branched alkyl groups represented by $R^1$ and $R^3$ is 60 to 95%, more preferably 70 to 90%.

When the ratio is less than 60%, the grease is soft and leaks from the bearings, and therefore the life of the bearings becomes short. When the ratio is more than 95%, the grease becomes hard, and the inflow property of the grease becomes worse, and therefore the life of the bearings becomes short.

Examples of the base oils which are employed in the grease composition of the present invention include ester synthetic oils. Examples of the ester synthetic oils include diester oils represented by di-2-ethylhexyl adipate (DOA), di-2-ethylhexylsebacate (DOS), di-isodecyl adipate (DIDA) and the like; aromatic ester oils represented by trimellitic acid ester oils and the like; and polyol ester oils represented by trimethylolpropane ester oils, pentaerythritol ester oils and the like.

Particularly suitable are ester synthetic oils having trivalent or more than trivalent ester groups in one molecule, such as trimethylolpropane ester oils, trimellitic acid ester oils, pyromellitic acid ester oils, pentaerythritol ester oils and dipentaerythritol ester oils; complex ester oils which are synthesized from polyalcohols (such as pentaerythritol) with monovalent fatty acids (such as caprylic acid) and polyvalent base acids (such as azelaic acid); and the like.

The ratio of ester synthetic oil to the total base oil is preferably not less than 20% by mass, more preferably not less than 50% by mass, most preferably 100% by mass. In order to sufficiently obtain the heat-resistant property and inflow property of the grease, not less than 20% by mass of ester synthetic oil is preferably contained. This is because ester synthetic oils facilitate the inflow property of the grease into the lubrication unit, since the ester synthetic oils have a high polarity and a high affinity for the thickener.

The base oil used for the grease of the present invention may contain base oils other than the ester synthetic oils. Examples of the other base oils include mineral oils and synthetic oils. Examples of the synthetic oils include diester oils; synthetic hydrocarbon oils represented by poly-α-olefin; ether synthetic oils represented by alkyldiphenyl ether; polyglycol synthetic oils represented by polypropylene glycol; silicone synthetic oils: and fluorinated synthetic oils.

Any additives generally used for the grease composition as required may be used for the grease composition of the present invention. Examples of the additives include antioxidants represented by amine antioxidants and phenol antioxidants; inorganic passivating agents such as sodium nitrite; rust inhibitors represented by sulfonate rust inhibitor, succinic acid rust inhibitor, amine rust inhibitor, carboxylate rust inhibitor; metal corrosion inhibitors represented by benzotriazole; oiliness agents represented by fatty acid, fatty acid ester, phosphoric acid ester; antiwear agents and extreme pressure agents represented by phosphorous agents, sulfuric agents and organometallic agents; and solid lubricants represented by metal oxide salts and molybdenum disulfide.

EXAMPLES

Preparation of Grease for Testing

A base grease was prepared by reacting an aromatic diisocyanate (diphenylmethane diisocyante) with a predermined amount of amines (cyclohexylamine, stearylamine, p-toluidine) in a base oil and diluted the resultant with a base oil to attain the worked penetration of 280. Additives are added to this grease to prepare grease compositions of Examples 1 to 4 and Comparative Examples 1 to 4.

Content of cyclohexyl group (CH) (%)=[{(the number of moles of cyclohexyl group)/(the number of moles of cyclohexyl group+the number of moles of alkyl groups)}×100]

Thickeners A1 to A5: cycloaliphatic/aliphatic diurea (cyclohexylamine and/or stearylamine were used)

Thickener B: aromatic diurea (p-toluidine was used)

Thickener C: Li soap (lithium 12-hydroxystearate)

Base Oil

Ester oil A: trimethylolpropane ester oil (kinematic viscosity at 40° C.: 24.5 mm$^2$/s)

Ester oil B: pentaerythritol ester oil (kinematic viscosity at 40° C.: 30.8 mm$^2$/s)

Ester oil C: dipentaerythritol ester oil (kinematic viscosity at 40° C.: 209 mm$^2$/s)

Ester oil D: complex ester oils (kinematic viscosity at 40° C.: 102 mm$^2$/s)

Mineral oil: kinematic viscosity at 40° C.: 102 mm$^2$/s

Synthetic hydrocarbon oil: kinematic viscosity at 40° C.: 63.3 mm$^2$/s

Phenyl ether oil: dialkyldiphenyl ether oil (kinematic viscosity at 40° C.: 100 mm$^2$/s)

Additive A: amine antioxidant (alkyl diphenylamine)

Additive B: sulfonate rust inhibitor (zinc dinonylnaphthalene sulfonate)

Test Method for Grease Composition

Worked penetration (JIS K2220): all the consistencies were set at 280

Outer Race Rotating Test

Outer race rotating test which estimates the bearing life under a high temperature was conducted. The bearing was driven under the following conditions, and the bearing life was determined when the motor overcurrent or abnormal vibration was detected, or the temperature of the motor exceeded the prescribed temperature by +15° C.
  Bearing type: 6203 rubber seal
  Test temperature: 160° C.
  Rotation rate: 16000 rpm
  Test load: radial load 800 N
Bearing Lubrication Life Test (based on ASTM D3336)
  Inner race rotating test which estimates the bearing life under a high temperature was conducted. The bearing was driven under the following conditions, and the bearing life was judged when the motor overcurrent was detected, or the temperature of the motor exceeded the prescribed temperature by +15° C.
  Bearing type: 6204 metal seal
  Test temperature: 180° C.
  Rotation rate: 10000 rpm
  Test load: axial load 66.7 N
  Radial load 66.7 N
Overall Judgment
  Outer Race Rotating Test qualified 500 hours or more disqualified less than 500 hours
  Bearing Lubrication Life qualified 500 hours or more disqualified less than 500 hours
  Qualified in Both the Test: ◯, the Others: X
The results are shown in Table 1.

TABLE 1

| Component | Examples | | | | Comparative Examples | | | |
|---|---|---|---|---|---|---|---|---|
| | 1 | 2 | 3 | 4 | 1 | 2 | 3 | 4 |
| Thickener A1 | 14.0 | | | | | | | |
| Thickener A2 | | 14.0 | | | | | | |
| Thickener A3 | | | 14.0 | | | | | |
| Thickener A4 | | | | 14.0 | | 14.0 | | |
| Thickener A5 | | | | | 14.0 | | | |
| Thickener B | | | | | | | 23.0 | |
| Thickener C | | | | | | | | 9.0 |
| Ester Oil A | | 20.5 | | | | | | |
| Ester Oil B | | | 45.1 | | 45.1 | | | 87.0 |
| Ester Oil C | 73.8 | | 36.9 | | 36.9 | | | |
| Ester Oil D | | | | 49.2 | | 8.2 | 73.0 | |
| Mineral Oil | 8.2 | | | | | | | |
| Synthetic Hydrocarbon Oil | | 61.5 | | | | | | |
| Phenyl Ether Oil | | | | 32.8 | | 73.8 | | |
| Additive A | 3.0 | 3.0 | 3.0 | 3.0 | 3.0 | 3.0 | 3.0 | 3.0 |
| Additive B | 1.0 | 1.0 | 1.0 | 1.0 | 1.0 | 1.0 | 1.0 | 1.0 |
| Worked Penetration | 280 | 280 | 280 | 280 | 280 | 280 | 280 | 280 |
| CH Content in Thickener | 70 | 75 | 87 | 90 | 50 | 90 | 0 | 0 |
| Ester Oil Content in Base Oil | 90 | 25 | 100 | 60 | 100 | 10 | 100 | 100 |
| Outer Race Rotating Test (H) | 520 | 550 | 1020 | 770 | 300 | 390 | 240 | 20 |
| Bearing Lubrication Life Test (H) | 600 | 610 | 1000 | 810 | 330 | 370 | 515 | 28 |
| Overall Judgment | ◯ | ◯ | ◯ | ◯ | x | x | x | x |

All of the results of the outer race rotating test and the bearing lubrication life test of the grease compositions of the Examples 1 to 4 were more than 500 hours, in which compositions the content of the thickener represented by the general formula (I) in which thickener the content of cyclohexyl group (CH) was 60 to 95%, and the content of the ester synthetic oil in the base oil was not less than 20% by mass based on the total base oil. Therefore, the grease compositions are excellent in the heat-resistant property and the inflow property.

In contrast, all of the results of the outer ring rotating test, the bearing lubrication life test or both of the tests of the grease composition of the Comparative Example 1 in which the thickener represented by the general formula (I) in which thickener the content of cyclohexyl group (CH) is 50%, the composition of the Comparative Example 2 in which the content of ester synthetic oil in the base oil is 10% by mass based on the total base oil and the composition of the Comparative Examples 3 and 4 in which the thickener represented by the general formula (I) in which thickener cyclohexyl group (CH) is not contained is used is less than 500 hours. Therefore, this shows that the object of the present invention is not attained.

What is claimed is:

1. A grease composition comprising a base oil and a thickener in the amount of 10.0 wt % to 18.0 wt % based on the total weight of the grease composition, characterized in that the base oil contains an ester synthetic oil and oils other than the ester synthetic oil, the ester synthetic oil is selected from the group consisting of trimethylolpropane ester oils, pentaerythritol ester oils, and dipentaerythritol ester oils, the content of the ester synthetic oil is not less than 20% by mass of total base oil, the oils other than the ester synthetic oil is selected from the group consisting of mineral oils, synthetic hydrocarbon oils, ether synthetic oils, and combinations thereof, and the thickener contains a diurea compound represented by the Formula (I):

$$R^1\text{—NHCONH—}R^2\text{—NHCONH—}R^3, \quad (I)$$

wherein $R^2$ is a diphenylmethylene group, $R^1$ and $R^3$ are the same or different, and represent cyclohexyl or $C_{8-22}$ linear or branched alkyl and the molar ratio of cyclohexyl to the total of cyclohexyl and $C_{8-22}$ linear or branched alkyl is 70 to 90%.

2. The grease composition according to claim 1, wherein the ester synthetic oil is an ester synthetic oil which has three or more ester groups in a molecule.

3. The grease composition according to claim 1, which is for bearings.

4. The grease composition according to claim 3, wherein the bearings are rolling bearings for automobile electrical equipment or auxiliaries.

5. The grease composition according to claim 4, wherein the roiling bearings for automobile electrical equipment or auxiliaries are outer race rotation type bearings.

6. A bearing in which the grease composition according to claim 1 is filled.

7. The grease composition according to claim 1, wherein the amount of the thickener is about 14 wt %, 8. The grease composition according to claim 1, wherein the grease composition is configured to have more than 500 hours of the bearing life measured by the outer race rotating test and more than 500 hours of the bearing life measured by the bearing lubrication life test.

\* \* \* \* \*